United States Patent [19]

Kobayashi et al.

[11] Patent Number: 4,593,578
[45] Date of Patent: Jun. 10, 1986

[54] RACK AND PINION TYPE STEERING GEAR DEVICE

[75] Inventors: Nobuo Kobayashi; Haruhiko Tanahashi, both of Aichi, Japan

[73] Assignee: Toyota Jidosha Kabushiki Kaisha, Aichi, Japan

[21] Appl. No.: 789,359

[22] Filed: Oct. 22, 1985

Related U.S. Application Data

[63] Continuation of Ser. No. 474,487, Mar. 11, 1983.

[30] Foreign Application Priority Data

Sep. 17, 1982 [JP] Japan .................. 57-140802[U]

[51] Int. Cl.$^4$ .................. F16H 1/04; B62D 1/20; B62D 5/06
[52] U.S. Cl. .................. 74/498; 74/422; 180/148
[58] Field of Search .................. 74/422, 498, 411; 180/148

[56] References Cited

U.S. PATENT DOCUMENTS

| | | | |
|---|---|---|---|
| 3,554,048 | 1/1971 | Adams | 74/498 |
| 3,572,158 | 3/1971 | Adams | 74/498 |
| 3,623,379 | 11/1971 | Bradshaw et al. | 74/422 |
| 3,844,181 | 10/1974 | Bayle | 74/422 |
| 4,095,482 | 6/1978 | Kirschner | 74/498 |
| 4,322,986 | 4/1982 | Adams et al. | 74/498 |
| 4,400,991 | 8/1983 | Breitweg et al. | 74/498 |
| 4,432,137 | 2/1984 | Okada | 30/292 |
| 4,539,857 | 9/1985 | Kako et al. | 74/422 |

FOREIGN PATENT DOCUMENTS

| | | | |
|---|---|---|---|
| 1175089 | 7/1964 | Fed. Rep. of Germany | 74/498 |
| 2629686 | 1/1977 | Fed. Rep. of Germany | 74/498 |
| 1289815 | 9/1972 | United Kingdom | 74/498 |

*Primary Examiner*—Kenneth J. Dorner
*Assistant Examiner*—Michael D. Bednarek
*Attorney, Agent, or Firm*—Finnegan, Henderson, Farabow, Garrett & Dunner

[57] ABSTRACT

In a rack and pinion type steering gear device having a rack guide to urge a rack from behind for applying a preload to the meshing engagement of tooth surfaces of the rack and pinion, wherein the rack guide is formed of an oleoresinous material having a low coefficient of friction and elastically deformable to a compression load to a predetermined value. The rack guide can bear a high load as compared with the conventional rack guide for the same displacement value, so that the rack guide can have a resisting force of a high value. Because of this, the pinion and the rack which are urged by the rack guide are not easily separated from each other under an external force.

The rack guide preferably includes a guide body having a rack sliding surface and outer peripheral ribs, and an elastic ring having the bottom end portion extending towards a nut farther by a predetermined value than the bottom end portion of said outer peripheral ribs and being elastically deformable to a compression load.

3 Claims, 3 Drawing Figures

RACK AND PINION TYPE STEERING GEAR DEVICE

This application is a continuation of application Ser. No. 474,487, filed Mar. 11, 1983.

BACKGROUND OF THE INVENTION

Field of the Invention

This invention relates to rack and pinion type steering gear devices, and more particularly to a rack and pinion type steering gear device having a rack guide for applying a preload to the meshing engagement of tooth surfaces of a rack and a pinion.

In many cases, the conventional rack guides are made of metallic materials through sintering and forging processes. However, these metallic rack guides are disadvantageous in that metallic striking sounds such as knockings occur during running of a vehicle on a rough road and the like.

Description will now be given of the causes with reference to FIG. 1.

Referring to FIG. 1, a pinion 1 is mounted on the forward end of a steering shaft, not shown, and a rack 2 is in mesh with this pinion 1.

A rack guide 3 is formed of a metal material and urges the rack 2 from behind the rack 2 for applying a preload to the meshing engagement between the pinion 1 and the rack 2.

Threadably coupled to a rack housing 5 is a nut 4, which is adapted to hold the rack guide 3 at a proper position through a spring 6.

Normally, a clearance $\Delta t$ is formed between the rack guide 3 and the nut 4 so that the rack guide 3 can avoid interfering with the nut 4 as the rack 2 slides. In this steering gear device having the above-described arrangement, when an external force $F_1$ in the axial direction of the rack 2 from a road surface is applied, there occurs a force $F_2$ in the axial direction of the rack guide as being a component of a pressure angle of the rack due to a reaction force of the pinion, whereby the rack guide 3 impinge on the nut 4, and subsequently, the rack 2 is returned through the resiliency of the spring 6 so that the pinion 1 impinges on the rack 2. This phenomenon is imparted to the driver as the knocking sounds. In passing, only the rack housing 5 is shown in cross section in FIG. 1.

SUMMARY OF THE INVENTION

The present invention has been developed to obviate the above-described disadvantages of the prior art and has as its object the provision of a rack and pinion type steering gear device capable of avoiding the occurrence of knocking sounds at a low cost.

To this end, the present invention contemplates that a rack guide is formed of an oleoresinous material and elastically deformable to a compression load to a predetermined value.

DETAILED DESCRIPTION OF THE PREFERRED EMBODIMENT

Figure 1:
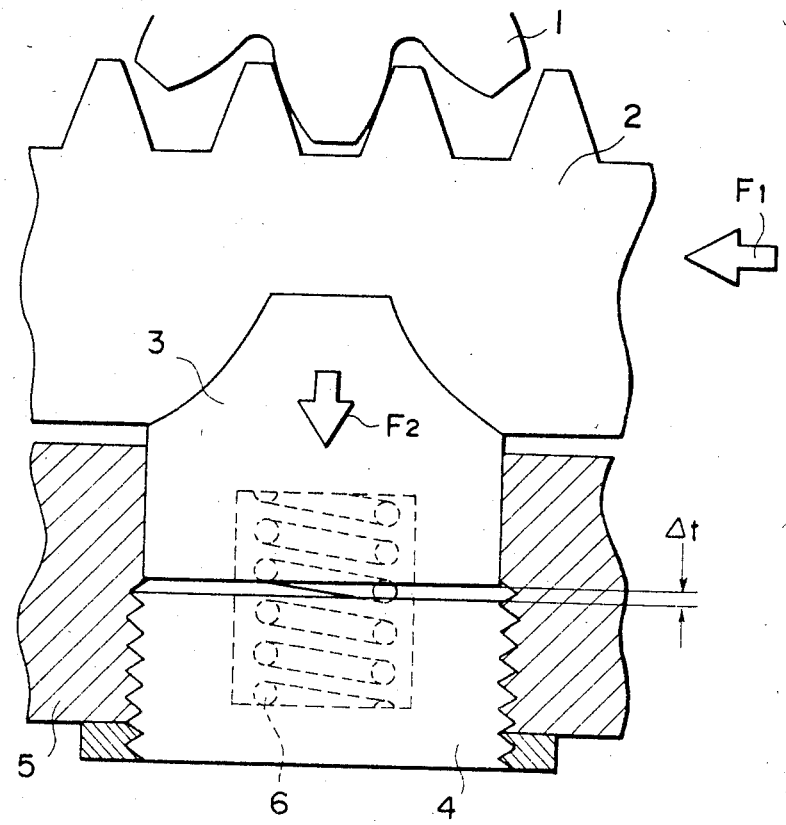
FIG. 1 is a sectional view of the essential portions showing the conventional rack and pinion type steering gear device.
Figure 2:
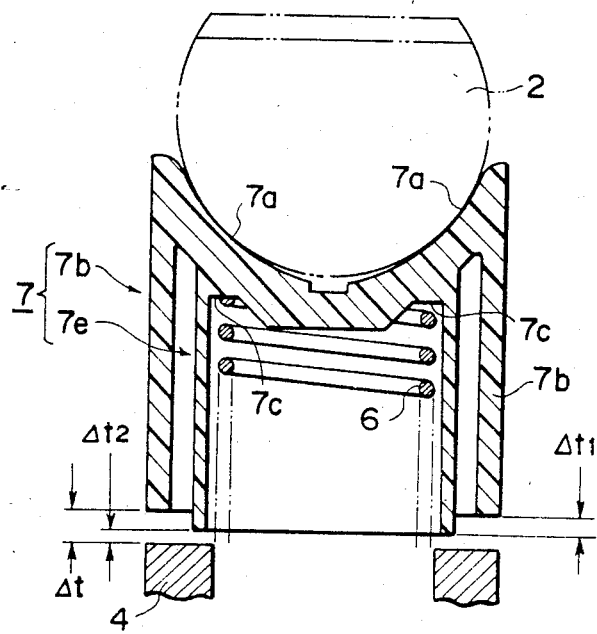
FIG. 2 is a sectional view of the essential portions showing an embodiment of the rack and pinion type steering gear device according to the present invention.

FIG. 2 is a sectional view of the essential portions showing an embodiment of the rack and pinion type steering gear device according to the present invention. Same reference numerals as shown in FIG. 1 are used in FIG. 2 to designate same or similar parts. Referring to FIG. 2, designated at 7 is a rack guide adapted to urge the rack 2 from behind for applying a preload to the meshing engagement of the tooth surfaces of the rack 2 and the pinion, not shown in FIG. 2. The rack guide 7 in this embodiment is integrally formed of an oleoresinous material having a low coefficient of friction, e.g., oleo-polyacetal, oleo-polyamide, oleo-polyethylene and oleo-polyimide, and comprises: a guide body 7d having a rack sliding surface 7a, on which the rack 2 slides, outer peripheral ribs 7b for positively supporting the rack 2 when a force of a great value is generated in the axial direction of the rack guide and a seating face 7c for supporting one end of a spring 6; and an elastic ring 7e provided inwardly of the outer peripheral ribs 7b, having the bottom end portion extending towards the nut 4 farther by a value of $\Delta t_1$ than the bottom end portion of the aforesaid outer peripheral ribs 7b, and elastically deformable to a compression load at a suitable spring constant. In addition, the oleoresinous rack guide 7 being of the shape shown in FIG. 2 can be readily produced by injection molding.

Figure 3:
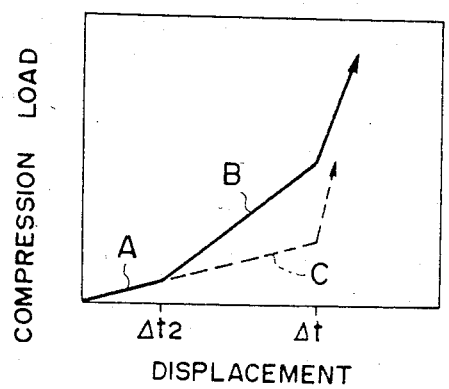
FIG. 3 shows the relationship of the compression loads with displacements in comparison between the devices according to the invention and the prior art.

When the rack guide 7 having the above-described construction is used, a force of a high value in the axial direction of the rack guide can be utilized as compared with the conventional rack guide because of the low coefficient of friction, whereby most value of the clearance $\Delta t$ shown in FIG. 1 can be turned into the value of elastic deformation of the elastic ring 7e. In other words, the clearance $\Delta t_2$ at the first stage can be made very small as compared with $\Delta t$ in the prior art. Further, this embodiment having the above-described construction, as indicated by a solid line in FIG. 3, the displacement due to the compression load advantageously has a so-called double bending characteristics in a displacement A by the spring 6 and a displacement B by the resilient ring 7e. Hence, the rack guide according to the present invention can bear a load of a high value as compared with the conventional rack guide for the same displacement value, whereby, a resisting force to an external force is high. Namely, even under an external force of a certain value, the pinion and the rack cannot be easily separated from each other, so that the knocking sounds can be prevented from occurring. In addition, in this FIG. 3, a dotted line C shows the deformation characteristics of the prior art, i.e., the displacement of the spring 6 due to the compression load.

As has been described hereinabove, the rack and pinion type steering gear device according to the present invention is constructed such that the rack guide is formed of the oleoresionous material and elastically deformable to a compression load to a predetermined value, and hence, can offer the various advantages that the device can control the occurrence of knocking sounds to a considerable extent at a low cost, and further, the device can be rendered light weight as compared with the conventional device using the metallic rack guide.

What is claimed is:

1. A rack and pinion type steering gear device comprising:
    a housing;
    a pinion supprted in said housing;
    a rack in mesh with said pinion;
    a rack guide slidably supported in said housing to urge said rack from behind for applying a preload to the meshing engagement of tooth surfaces of said rack and pinion;
    a spring biasing said rack guide;
    a nut threadably coupled to said housing for holding said rack guide at a proper position in said housing through said spring;
    a clearance formed between said rack guide and said nut;
    said rack guide being formed of an oleoresinous material having a low coefficient of friction and being elastically deformable to a compression load to a predetermined value, said rack guide including a guide body having a rack sliding surface, outer peripheral ribs axially extending toward said nut, and an elastic ring having the bottom end portion extending towards the nut farther by a predetermined distance within said clearance than the bottom end portion of said outer peripheral ribs and being elastically deformable to a compression load, such that the ring end is disposed for resiliently contacting the nut before the ends of the ribs contact the nut.

2. A rack and pinion type steering gear device as set forth in claim 1, wherein said oleoresinous material is selected from the group consisting of oleo-polyacetal, oleo-polyamide, oleo-polyethylene and oleo-polyimide.

3. A rack and pinion type steering gear device as set forth in claim 1, wherein said rack guide is produced by injection molding.

* * * * *